United States Patent
Bostoen et al.

(10) Patent No.: US 7,050,548 B2
(45) Date of Patent: May 23, 2006

(54) LOCALIZATION OF CUSTOMER PREMISES IN A LOCAL LOOP BASED ON REFLECTOMETRY MEASUREMENTS

(75) Inventors: Tom Bostoen, Brugge St. Andries (BE); Thierry Pollet, Mechelen (BE); Patrick Jan Maria Boets, Heffen (BE); Leonard Pierre Van Biesen, Aalst (BE)

(73) Assignee: Alcatel, Paris (FR)

( * ) Notice: Subject to any disclaimer, the term of this patent is extended or adjusted under 35 U.S.C. 154(b) by 389 days.

(21) Appl. No.: 10/629,706

(22) Filed: Jul. 30, 2003

(65) Prior Publication Data

US 2004/0022368 A1    Feb. 5, 2004

(30) Foreign Application Priority Data

Aug. 5, 2002   (EP)   .................................. 02291967

(51) Int. Cl.
*H04M 1/24*   (2006.01)
*H04M 3/08*   (2006.01)
*H04M 3/22*   (2006.01)

(52) U.S. Cl. .............................. 379/27.01; 379/27.03; 379/30

(58) Field of Classification Search ............... 379/1.01, 379/22–22.04, 24, 27.01–27.03, 29.03–29.05, 379/30; 324/500, 512, 525, 600, 642
See application file for complete search history.

(56) References Cited

U.S. PATENT DOCUMENTS 5,128,619 A * 7/1992 Bjork et al. ................. 324/533
6,081,125 A * 6/2000 Krekels et al. .............. 324/601
6,205,220 B1 * 3/2001 Jacobsen et al. ............ 379/417
6,263,047 B1 * 7/2001 Randle et al. ................ 379/31
6,421,624 B1 * 7/2002 Nakayama et al. ......... 702/117
6,745,137 B1 * 6/2004 Krishnamachari et al. .... 702/57
6,825,672 B1 * 11/2004 Lo et al. ...................... 324/533
6,909,978 B1 * 6/2005 Bostoen et al. ............... 702/65
2002/0186760 A1   12/2002 Bostoen et al.
2003/0198305 A1 * 10/2003 Taylor et al. ................ 375/341
2004/0019451 A1   1/2004 Vermeiren et al.
2004/0196158 A1 * 10/2004 Sugaya et al. ........... 340/815.4

FOREIGN PATENT DOCUMENTS

WO    WO 01/01158 A1    1/2001

OTHER PUBLICATIONS

P. Boets et al, "The modelling aspect of transmission line networks," Proceedings of the Instrumentation and Measurement Technology Conference, NY, May 12-14, 1992, NY, IEEE, May 12, 1992, pp. 137-141, XP010063946.

* cited by examiner

*Primary Examiner*—Duc Nguyen
(74) *Attorney, Agent, or Firm*—Sughrue Mion, PLLC

(57) ABSTRACT

In the course of a reflectometry-based qualification procedure of a local loop, which connects customer premises to a central office of a telecommunication network, and in the event of being unable to identify the loop termination associated with the customer premises, a second reflectometry measurement of the local loop is carried out with a different impedance load at the customer premises. Next, the two reflectograms are compared with each other in the time domain in order to delineate among all the reflections those at the customer premises and to determine therefrom the position of the customer premises in the local loop.

10 Claims, 5 Drawing Sheets

LOCALIZATION OF CUSTOMER PREMISES IN A LOCAL LOOP BASED ON REFLECTOMETRY MEASUREMENTS

The present invention relates to a method to qualify a local loop from reflectometry measurements thereof, as described in the preamble of claim 1, and to an apparatus wherein the method is applied, as described in the preamble of claim 6.

Such a method and apparatus wherein such a method is applied are already known in the art, e.g. from the European patent application number 01400832.0 entitled 'Method and Apparatus for Identification of an Access Network by means of 1-port Measurements', being filed on $2^{nd}$ Apr. 2001 in the name of Alcatel. Therein, a method to predict network parameters of a local loop from reflectometry measurements thereof is described.

A local loop is a two-conductor transmission line that connects customer premises to a central office of a telecommunication network. Originally, the local loop has given the customer access to the Plain Old Telephony Service (POTS). This copper-wired access network has been de-facto the medium to deliver at the best cost new telecommunication services to residential users. Digital Subscriber Line (DSL) services exploits the frequency band above 4 kHz up to several MHz, which is not used by the POTS, to provide the customer with high speed internet access (up to a few Mbit/s).

Nevertheless, the local loop was engineered for voice-band transmission without any prospect for data telecommunication services operating at higher frequency. The local loop may have several impairments for DSL services that do not affect the POTS, such as bridged taps (open ended line derivation spliced or coupled to the main line), mixed wire gauge, splices, etc. DSL services are mostly affected by reflections arising along the line, which stem from any non-uniformity in the impedance of the transmission line. Reflections interfere with the direct DSL signal and, at those frequencies for which the interference is destructive, reduce the magnitude of the received signal.

It is therefore necessary to evaluate a priori the line quality before implementing DSL services. An object of the known method is to predict the maximum bit rate achievable over a local loop—also referred to as theoretical channel capacity of the local loop—for a telecommunication service to be delivered over the local loop with the expected quality, namely to qualify a local loop for a telecommunication service.

In a preliminary step of the known method, a physical model of the local loop is defined from the electromagnetic theory specifying how the voltage and current waves propagates throughout the loop. The local loop is modeled as comprising a plurality of line sections spliced or coupled to each other in a tree-like structure wherein:
- the root of the tree is a line termination being wired to the central office,
- a branch of the tree is a two-conductor uniform line section,
- a node of the tree is a connection between a plurality of line sections,
- a leave of the tree is a line termination, all being left open except one being wired to the customer premises.

The root or the leaves of the tree are referred to as loop termination further in the text.

A line section is modeled by the brace $(Z_0, e^{-\gamma l})$ where $Z_0$ is the characteristic impedance of the line section, $\gamma$ is the propagation constant of the line section, and $l$ is the length of the line section. $Z_0$ and $\gamma$ can be expressed as a function of the frequency f and of a finite number of coefficients, the coefficients being defined from the cross-sectional geometric dimensions of the line and the material constants of the line. $(Z_0, e^{-\gamma l})$ specifies the way the voltage and current waves propagate along the line as well as their respective ratio. The boundary conditions, which the line voltage and the line current must comply with at a splice or at a line termination, yield the reflections and the transmission factor of the voltage and current waves at that splice or at that line termination. Extending the reasoning to the entire loop yields a parametric model specifying how the voltage and current waves propagate throughout the loop, the above mentioned coefficients being the parameters thereof. The network parameters of the local loop, such as the scattering matrix or the ABCD matrix, are computed therefrom.

In a further step of the known method, an initial electrical signal is generated and coupled to a loop termination, while the electrical waveforms at that coupling point are observed. The observed waveform is comprised of an amount of the initial signal and an amount of each signal, if any, that is reflected back from any non-uniformity in the impedance of the transmission line. This measurement procedure is known in the art as reflectometry, more specifically as time domain reflectometry or frequency domain reflectometry depending on whether the observed waveform is measured in the time domain or in the frequency domain respectively. The measured signal is called a reflectogram, a time domain reflectogram or a frequency domain reflectogram.

At that stage of the qualification process, the local loop is considered as a one-port system, the loop termination at which the reflectometry measurements are performed being the reference port thereof. The loop termination being wired to the customer premises is loaded with a first impedance, given a definition thereof (e.g., an open-circuit) or, at least, an approximation in the considered frequency domain (e.g., by means of a RLC circuit).

In a further step of the known method, the coefficient values of the parametric model are estimated. The estimation process includes the steps of:
- assigning an initial value to some of the coefficients by making use of a quasi-realistic model of the local loop,
- computing from the parametric model the scattering parameter $S_{11}$ of the local loop, namely $S_{11}^{model}$, the scattering parameter $S_{11}$ being defined as the ratio in the frequency domain of the backward travelling wave or reflected wave over the forward travelling wave or incident wave,
- computing from the reflectometry measurements the scattering parameter $S_{11}$ of the local loop, namely $S_{11}^{measurement}$,
- quantifying a difference between the scattering parameters $S_{11}^{model}$ and $S_{11}^{measurement}$ by introducing a cost function,
- reducing the difference by adapting the coefficient values of the parametric model.

The quasi-realistic model provides initial values to the coefficients of the parametric model for the computation of the scattering parameter $S_{11}^{model}$. The initial values of the coefficients should preferably have the order of magnitude predicted by their formula so that the optimization of the cost function determines a absolute minimum and does not get trapped in a local minimum. The quasi-realistic model is a white box model with as much a-priori knowledge as possible, as opposed to a black box model. The quasi-realistic model of the local loop is based upon an assumed or an estimated loop topology, and possibly upon the type of transmission line used in the field as presumably known to the telecommunication operator. A method to estimate the topology of a local loop from reflectometry measurements thereof is already known in the art, e.g. from the European patent application number 02291902.1 entitled 'Interpretation System for Interpreting Reflectometry Information', being filed on $26^{th}$, Jul. 2002 in the name of Alcatel. Therein, an expert system built upon a belief network and a rule-based system is described that determines the tree structure of the local loop and estimates the delay introduced by each line section.

Once the coefficients have been estimated, it is possible to compute the transfer function between any loop termination, the local loop now being considered as a multi-port system. Given the so-computed transfer function between the central office and the customer premises, given an estimated or measured Power Spectral Density (PSD) of the noise at the customer premises, it is possible to compute the theoretical channel capacity of the local loop.

While the loop termination associated with the central office can be easily ascertained, guessing which one of the loop terminations is associated with the customer premises is not that obvious when there are more than one candidate. Without that piece of information, it is impossible to determine which one of the transfer functions must be used to compute the theoretical channel capacity of the local loop.

An object of the present invention is to determine which one of the loop terminations the customer premises are associated with, given an assumed or an estimated topology of the local loop.

According to the invention, this object is achieved by the method defined in claim 1 and by the apparatus defined in claim 6. A second reflectogram is carried out while the loop termination being wired to the customer premises is loaded with a second impedance distinct from the first impedance. Next, the first reflectogram is compared in the time domain with the second reflectogram in order to delineate among all the reflections those at the customer premises. Indeed, an impedance change at one loop termination affects only the reflections at that loop termination, all the other reflections remaining unchanged. The observed waveforms diverge one from the other whenever signals reflected back from the customer premises are present. The first divergence peak delineates the first order reflection. Therefrom, the round trip delay between the measurement side and the customer side is estimated. It is noteworthy that the magnitude of the divergence peaks decreases as the time increases, since the more delay the more attenuation. The skilled person will appreciate that other features in the outcome of the comparison step could be used to estimate the round trip delay with an acceptable accuracy.

Given the following pieces of information, as provided by the telecommunication operator and/or by the above mentioned expert system:
the tree structure of the local loop,
the delay introduced by each line section, it is possible to select, out of all the paths between the loop termination at which the measurements are performed and any other loop termination, the path which the accumulated delay matches the closest the measured round trip delay.

Once the loop termination associated with the customer premises has been identified, the proper transfer function can be selected for the computation of the theoretical channel capacity between the central office and the customer premises.

Preferably, such an impedance switching at the customer side should be remotely controllable or remotely observable at the measurement side, so as to keep the whole qualification process at one side. Various embodiments for switching remotely the impedance load at the customer premises can be thought off. The claim 2 defines such an embodiment if the POTS is already supplied to the customer over the local loop. The first reflectogram is executed while all the phones at the customer premises are on-hook (very large impedance acting as an open circuit), the phone line being idle, and the second reflectogram is executed while one phone at least is off-hook, the phone line being busy. A maintenance phone call to the customer may initiate the impedance switching.

Another characterizing embodiment of the present method and of the present apparatus is defined in the claims 3 and 7. The reflectometry measurements are performed in the time domain to proceed directly with the comparison step without any further processing, provided the same signal has been used to excite the loop.

Another characterizing embodiment of the present method and of the present apparatus is defined in the claims 4 and 8. The reflectometry measurements are performed in the frequency domain, next the measurement results are converted back to the time domain, e.g. by means of the Inverse Fast Fourrier Transform (IFFT), before proceeding with the comparison step.

Another characterizing embodiment of the present method and of the present apparatus is defined in the claims 5 and 9. An incident and a reflected wave are delineated from the observed waveform, e.g. by measuring both the line voltage and the reflected voltage wave. It is then possible to compute the time domain reflectogram of a reference signal, such as a direct pulse. In so doing, the excitation signals need not to be identical to proceed with the comparison step.

Further characterizing embodiments of the present method and of the present apparatus are mentioned in the appended claims.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 3:
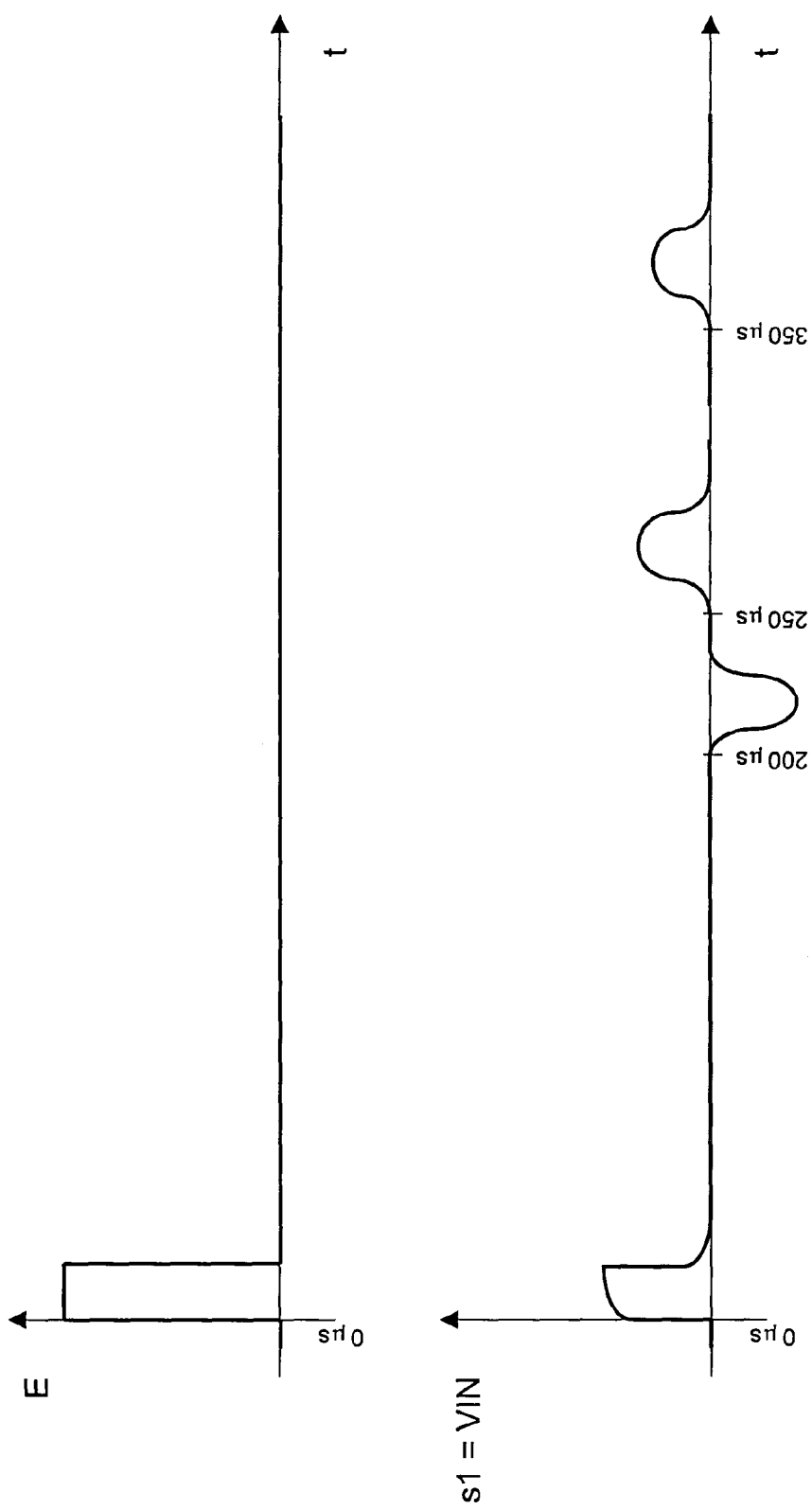
Figure 4:
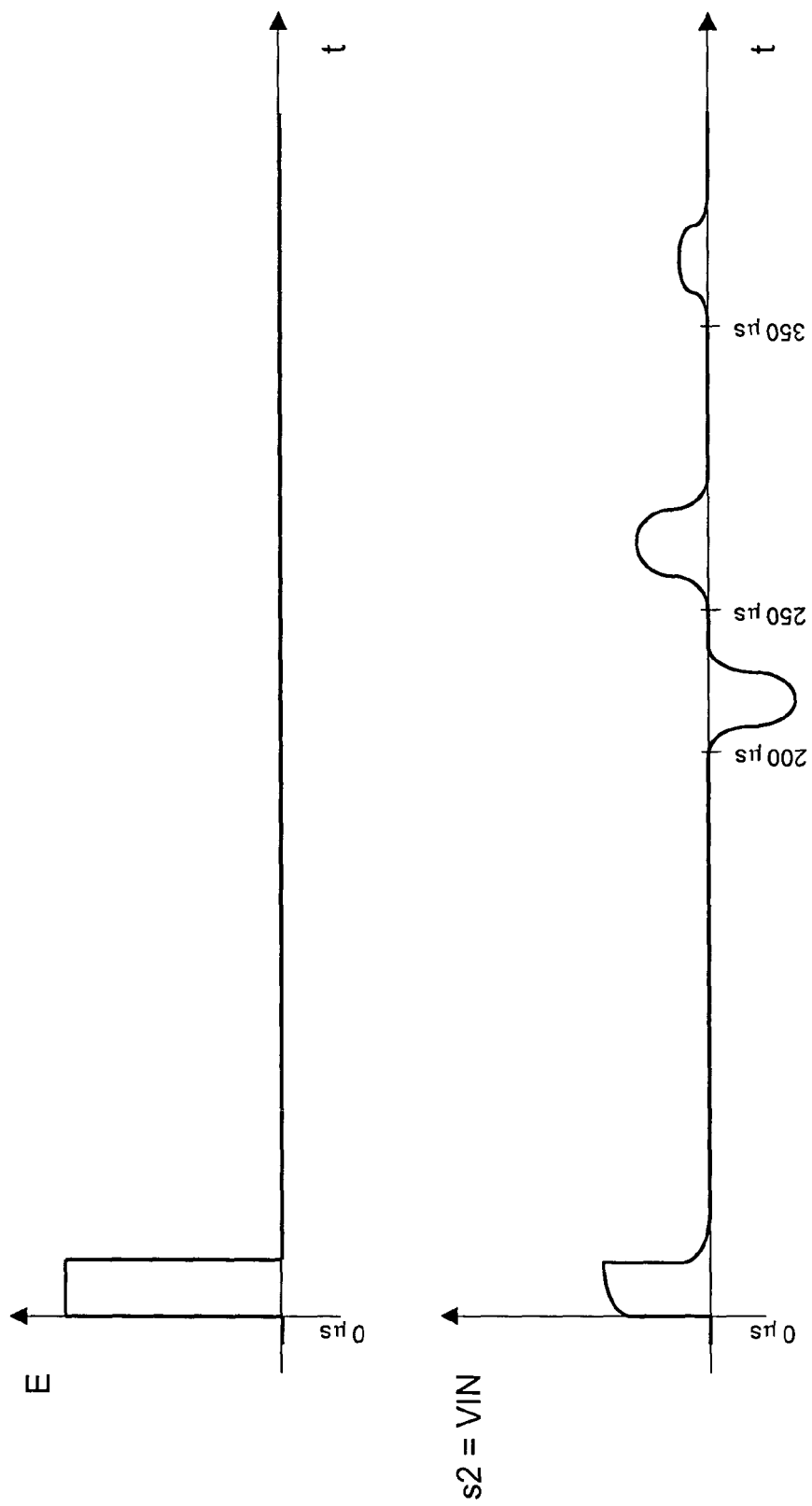
Figure 5:
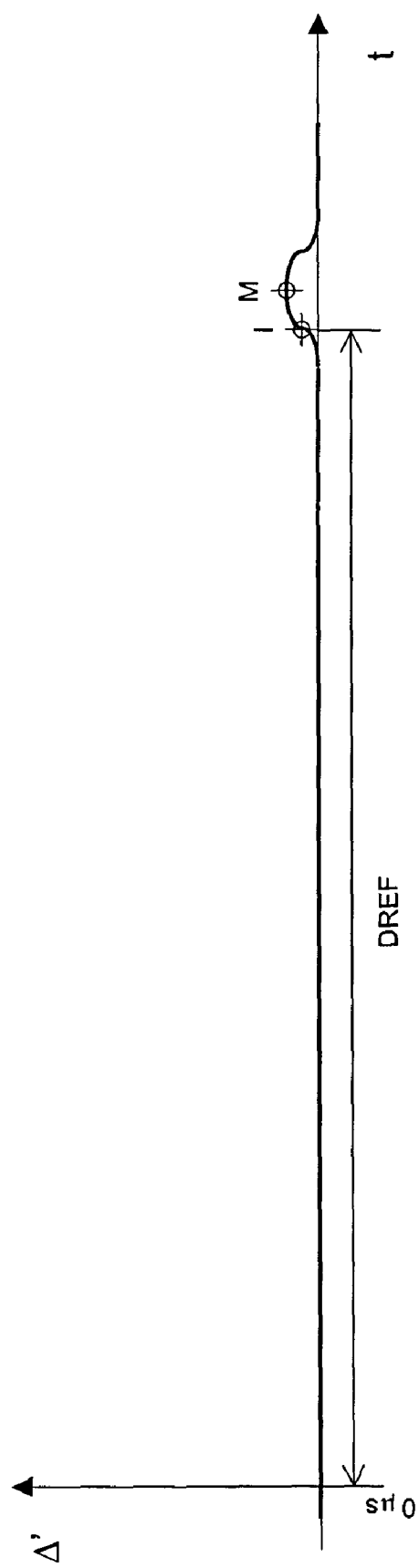

FIG. 3 represents a first reflectogram (inc. the initial excitation signal), executed while all the phones at the customer premises are on-hook, FIG. 4 represents a second reflectogram (inc. the initial excitation signal), executed while one phone at least at the customer premises is off-hook, FIG. 5 represents the comparison of the first reflectogram with the second reflectogram, achieved by subtracting the second reflectogram from the first reflectogram.

Figure 1:
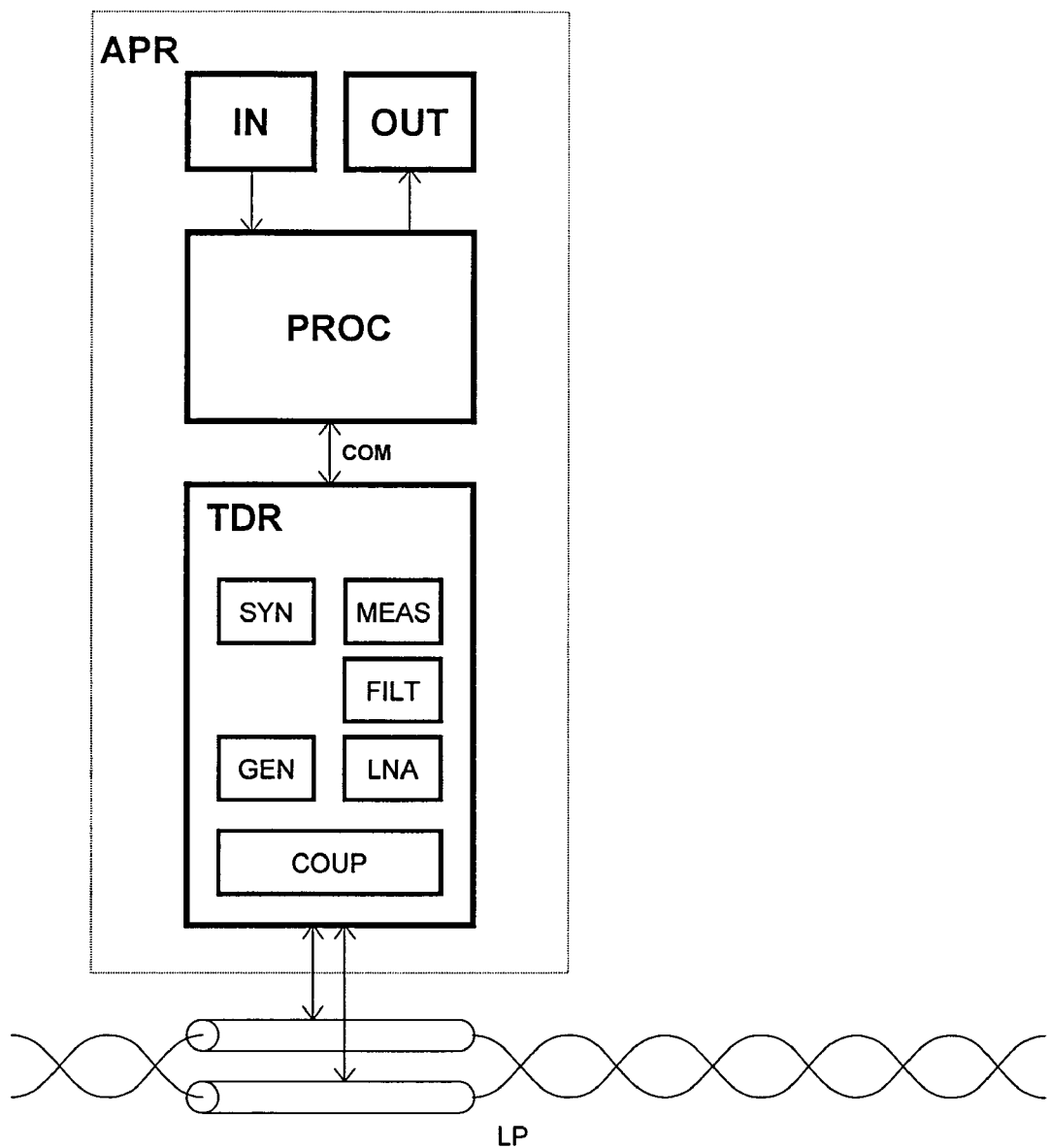
FIG. 1 represents an apparatus according to the invention.

A preferred embodiment of the present invention as depicted in FIG. 1 comprises:
- an input device IN,
- an output device OUT,
- a time domain reflectometry unit TDR and
- a processing unit PROC.

The input device IN and the output device OUT are coupled to the processing unit PROC. The time domain reflectometry unit TDR is coupled to the processing unit PROC via a data communication bus COM, such as a serial bus, and to the local loop LP.

The apparatus APR is integrated as a handheld testing device that can be used by a technician in the field, e.g. at the central office next to a distribution frame.

The input means comprises a keyboard and a computer mouse associated with a graphical user interface and are adapted to:
- trigger the time domain reflectometry measurements,
- enter or select from a drop-down menu any useful pieces of information such as characteristics of the local loop to be qualified (used in the parametric model), measurement settings, etc.

The output device OUT comprises a display screen to provide a technician with the outcome of the qualification procedure, such as a yes/no answer to whether the loop capacity is greater or less than a pre-determined target figure.

The time domain reflectometry unit TDR comprises the following functional units:
- a generation unit GEN, to generate an electrical signal of a given shape and within a given spectrum range,
- a measurement unit MEAS, to measure in the time domain an electrical signal, such as a voltage, including an analog to digital converter,
- a coupling unit COUP, to couple the excitation signal from the generation unit GEN to a conductor pair and to provide the measurement unit MEAS with the appropriate measurement access points,
- a filtering unit FILT, to filter the signal from the local loop LP, comprising:
  - a high-pass filter, to attenuate strongly the frequency band up to 4 kHz, which may carry POTS signalling and voice traffic,
  - an low-pass anti-alias filter for the analog to digital conversion,
- a low-noise amplifier LNA, to amplify the signal from the local loop LP,
- a synchronization unit SYN, to trigger synchronously the generation unit GEN and the measurement unit MEAS.

The processing unit comprises a Pentium III processor supplied by Intel Corp, as well as all the necessary hardware as known to the skilled person, such as random access memory, a hard disk, an interruption controller, a DMA controller, a graphic card, I/O peripherals, etc.

The processing unit PROC runs software which carries out any of the method in accordance with the present invention, more specifically:
- gather and average the measurement results from the time domain reflectometry unit TDR,
- estimate from these measurement results the topology of the local loop, as already known to the art,
- estimate from these measurement results the network parameters of the local loop, as already known to the art,
- determine from these measurement results which one of the loop terminations the customer premises are associated with,
- qualify the local loop for a specific telecommunication service.

The electrical signal used to excite the local loop is a block pulse signal. The signal type as well as the burst duration can be set via the input means IN.

The measured electrical signals are the line voltage VIN in conjunction with the reflected voltage wave VIN—. The latter allows the discrimination of the incident and reflected waves within the line voltage in order to compute the scattering parameter $S_{11}^{measurement}$.

Upon request from the operator via the input device IN, the processing unit PROC triggers the time domain reflectometry unit TDR via the data communication bus COM for it to carry out a time domain reflectometry measurement. Thereupon, the synchronization unit SYN triggers both the generation unit GEN, to generate an excitation signal, and the measurement unit MEAS, to start measuring the resulting signals at the coupling point. A measurement is a set of digital samples, each sample being the encoded magnitude of the measured signal at a particular instance of time. The measurement results are delivered via the data communication bus COM back to the processing unit PROC for further processing. The measurement procedure is repeated a few times over a small period so as to compute the mean and variance value of each sample.

In the following, the operation of the preferred embodiment will be described with reference to an instance of a local loop. However, the present invention is not limited thereto.

Figure 2:
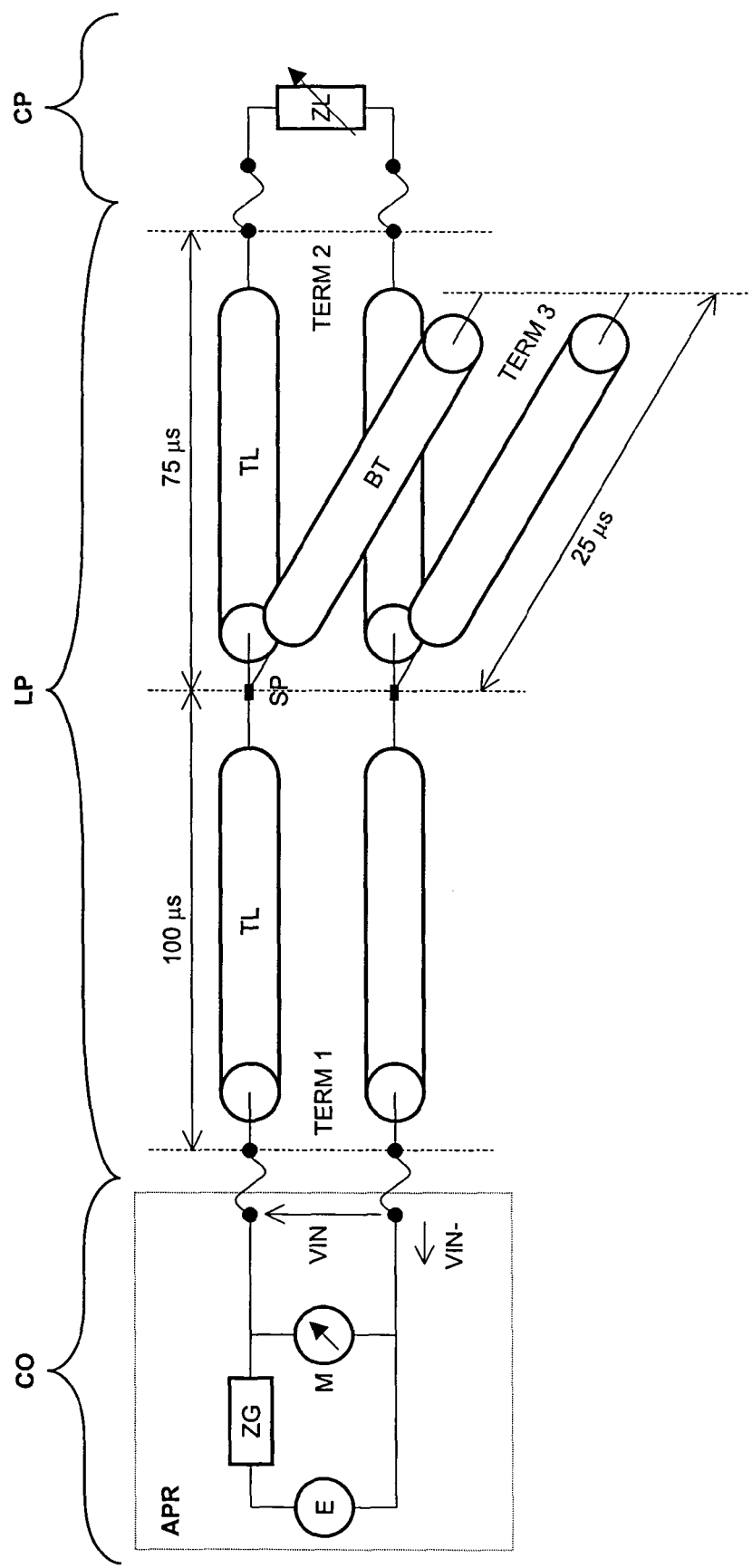
FIG. 2 represents an instance of a local loop.

The local loop LP as depicted in FIG. 2 comprises a single transmission line TL with at some point along the line a bridged tap BT. The apparatus APR stands at the central office CO and is coupled to the termination TERM 1 of the local loop LP. The apparatus APR is modeled as a voltage source E serially connected to an impedance ZG and as a measurement device M measuring the line voltage V1 and the reflected voltage wave V1—. At the customer premises CP, a communication terminal (e.g., a phone set) is wired to the termination TERM 2 of the local loop LP. The communication terminal is modeled as a variable impedance ZL.

A first reflectometry measurement takes place while the phone line is idle (see FIG. 3). The phone set at the customer premises CP is on-hook and acts as an open circuit (ZL=∞). The prediction of the loop topology and the prediction of the network parameters of the local loop are carried out therefrom.

The prediction of the loop topology yields the following results (refer to the above mentioned patent for further details):
- a first line section ($Z_{01}$, $e^{-\gamma_1 l_1}$) with a splice SP at 100 μs from the termination TERM 1,
- from the splice SP on, 2 line sections ($Z_{02}, e^{-\gamma_2 l_2}$) and ($Z_{03}, e^{-\gamma_3 l_3}$) with respectively 75 μs and 25 μs as transmission delay.

Once the tree structure of the local loop has been determined, the corresponding parametric model is selected from a predefined collection of parametric models. If no match is found, the operator is requested via the output device OUT to import or to create the corresponding parametric model.

The 1-port scattering parameter $S_{11}^{model}$ for a subscriber loop with a bridged tap is given by:

$$S_{11}^{model} = \frac{\begin{array}{c}-\rho_g + \rho_{23}e^{-2\gamma_1 l_1} + \rho_g\rho_2\rho_{13}e^{-2\gamma_2 l_2} + \rho_g\rho_3\rho_{12}e^{-2\gamma_3 l_3} - \\ \rho_2\rho_{12}e^{-2(\gamma_1 l_1+\gamma_2 l_2)} - \rho_3\rho_{13}e^{-2(\gamma_1 l_1+\gamma_3 l_3)} - \rho_g\rho_2\rho_3\rho_{23}e^{-2(\gamma_2 l_2+\gamma_3 l_3)} + \rho_2\rho_3 e^{-2(\gamma_1 l_1+\gamma_2 l_2+\gamma_3 l_3)}\end{array}}{\begin{array}{c}1 - \rho_g\rho_{23}e^{-2\gamma_1 l_1} - \rho_2\rho_{13}e^{-2\gamma_2 l_2} - \rho_3\rho_{12}e^{-2\gamma_3 l_3} + \rho_g\rho_2\rho_{12}e^{-2(\gamma_1 l_1+\gamma_2 l_2)} + \\ \rho_g\rho_3\rho_{13}e^{-2(\gamma_1 l_1+\gamma_3 l_3)} + \rho_2\rho_3\rho_{23}e^{-2(\gamma_2 l_2+\gamma_3 l_3)} - \rho_g\rho_2\rho_3 e^{-2(\gamma_1 l_1+\gamma_2 l_2+\gamma_3 l_3)}\end{array}}$$

where:

$$\rho_g = \frac{Z_g - Z_{01}}{Z_g + Z_{01}}, \quad \rho_{ij} = \frac{Z_{0i}Z_{0j} - Z_{0i}Z_{0k} - Z_{0j}Z_{0k}}{Z_{0i}Z_{0j} + Z_{0i}Z_{0k} + Z_{0j}Z_{0k}},$$

with $(i,j,k)=\{(1,2,3),(1,3,2),(2,3,1)\}$, $$\rho_i = \frac{Z_i - Z_{02}}{Z_i + Z_{02}},$$

with $i=\{2,3\}$, $Z_i$ is the impedance load at the termination TERM i.

The transmission line type, as known to the telecommunication operator and as entered via the input device IN, is an Unshielded Twisted Pair (UTP) consisting of 2 parallel circular cylindrical conductors immersed in a homogeneous dielectric, which is assumed to be linear and isotropic. $(Z_0, e^{-\gamma l})$ of a UTP is given by:

$$Z_0 = \frac{\gamma l}{y_p l}$$

$$\gamma l = \sqrt{z_s y_p l^2} = \sqrt{a_4 s^2 + a_1 s\sqrt{-s}\frac{J_0}{J_1} + \frac{a_1 a_3}{2}s^2 \Psi}$$

where:

$s=j\omega=j2\pi f$ represents the Laplace frequency, $$\Psi = \frac{3a_2^3 J_3 J_2 + 2a_2 J_1 J_2 + a_2^2 J_0 J_3}{a_2^3 J_2 J_3 + a_2 J_1 J_2 + 3a_2^2 J_0 J_3 + J_0 J_1}$$

denotes an auxiliary function used in the calculations,
$J_i = J_i(a_3\sqrt{-s})$ denotes the Bessel function,
$y_p = \alpha_5 s/l$ is the parallel per-unit length admittance of the transmission line.

The coefficients $\alpha_1$ to $\alpha_5$ may be given initial values in accordance with:

$$a_1 = \frac{1}{a\pi}\sqrt{\frac{\mu}{\sigma}}\frac{\varepsilon}{\operatorname{arcosh}(D/2a)}l$$

$$a_2 = \left(\frac{a}{D}\right)^2$$

$$a_3 = a\sqrt{\mu\sigma}$$

$$a_4 = \frac{a_1 a_3}{\ln(1/\sqrt{a_2})}$$

$$a_5 = \frac{\pi\varepsilon}{\operatorname{arcosh}(D/2a)}l$$

where:
$\alpha$ is the radius of the circular conductors (same radius for both conductors),
D is the distance between the 2 conductor axis,
$\sigma$ is the conductivity of the conductor material (e.g., copper),
$\epsilon$ and $\mu$ are respectively the electrical permittivity and magnetical permeability of the dielectric material (e.g., polyethylene).

15 coefficients are thus defined for the parametric model of the local loop LP, 5 for each line section. The coefficients need to be optimized with respect to the first measured reflectogram. Refer to the above mentioned patent for further details about the cost function and the optimization algorithm.

Once the coefficients have been optimized, the theoretical channel capacity of the local loop can be computed from the formula:

$$C = \int_0^W \log_2\left(1 + \frac{|H(f)|^2 S(f)}{N(f)}\right) df$$

where:
H(f) denotes the transfer function between the central office CO and the customer premises CP,
S(f) denotes the power spectral density of the signal transmitted at the central office CO over the local LP,
N(f) denotes the power spectral density of the noise at the customer premises CP.

As expected, the following issue arises: which one of the transfer functions $H_{12}$ or $H_{13}$ is the transfer function between the central office CO and the customer premises CP or, alternatively, which one of the loop terminations TERM 2 or TERM 3 the customer premises CP are associated with? Therefore, a second reflectogram is executed to determine the loop termination associated with the customer premises CP.

The second reflectometry measurement takes place while a phone call is on-going (see FIG. 4), the phone set at the customer premises CP being off-hook (ZL≠∞). The phone call can be initiated by the technician himself or by a third party.

The first time domain reflectogram is then compared with the second time domain reflectogram in the processing unit PROC by subtracting one from the other, that is to say:

$$\Delta(n)=|s_1(n)-s_2(n)|,$$

where:
$s_1(n)$ is the $n^{th}$ averaged sample of the first time domain reflectogram,
$s_2(n)$ is the $n^{th}$ averaged sample of the second time domain reflectogram.

The result of the subtraction is smoothed by correlating $\Delta$ with a Gaussian function h:

$$\Delta'(n) = \sum_{k=-\infty}^{+\infty} \Delta(n-k) \times h(k)$$

where:

$h(k)=e^{-t}I_k(t)$, $I_k(t)$ denotes the modified Bessel function of integer order k, t is the scaling factor, to be chosen adequately.

Δ' function is finally used to determine the round trip delay between the measurement side and the customer side. First, the global maximum M of Δ' function (dΔ'/dt=0) is looked for (see FIG. 5). Next, the first inflexion point I of Δ' function ($d^2\Delta'/dt^2=0$) preceding the global maximum M is looked for (see FIG. 5). The time corresponding to this inflexion point with respect to the time at which the initial signal has been coupled to the local loop LP defines the reference delay DREF (see FIG. 5).

The reference delay DREF is used ultimately to identify the loop termination associated with the customer premises. This is achieved by selecting, out of all the paths between the loop termination at which the measurements are performed and any other loop termination, the path which the accumulated delay matches the closest the reference delay DREF.

Still referring to FIG. 2, the round trip delay between TERM 1 and TERM 2 is (100+75)×2=350 s and the round trip delay between TERM 1 and TERM 3 is (100+25)× 2=250 μs. By comparing them against DREF≅350 μs, TERM 2 is undoubtedly the loop termination associated with the customer premises CP.

Once the loop termination associated with the customer premises CP has been identified, the proper transfer function is selected for the computation of the theoretical channel capacity between the central office CO and the customer premises CP.

The transfer function between the central office CO and the customer premises CP is thus given by:

$$H = H_{12} = \frac{\tau_{23}\tau_l(e^{-(\gamma_1 l_1 + \gamma_2 l_2)} + e^{-(\gamma_1 l_1 + \gamma_2 l_2 + 2\gamma_3 l_3)})}{1 + \rho_{23}e^{-2\gamma_1 l_1} - \rho_l\rho_{13}e^{-2\gamma_2 l_2} - \rho_{12}e^{-2\gamma_3 l_3} - \rho_l\rho_{12}e^{-2(\gamma_1 l_1 + \gamma_2 l_2)} - \rho_{13}e^{-2(\gamma_1 l_1 + \gamma_3 l_3)} + \rho_l\rho_{23}e^{-2(\gamma_2 l_2 + \gamma_3 l_3)} + \rho_l e^{-2(\gamma_1 l_1 + \gamma_2 l_2 + \gamma_3 l_3)}}$$

where:

$\tau_{ij}=1+\rho_{ij}$, with (i,j)={(1,2),(1,3),(2,3)}, $$\rho_l = \frac{Z_l - Z_{02}}{Z_l + Z_{02}},$$

$\tau_l=1+\rho_l$.

The theoretical channel capacity between the central office CO and the customer premises CP is computed therefrom, with $Z_l$ and S(f) being substituted by their respective service value (e.g., $Z_l$=100 or 135 Ω for a DSL modem). The so-computed capacity is eventually displayed via the output device OUT as a yes/no answer to whether the loop capacity is greater or less than a pre-determined target figure, that is to say as a yes/no answer to whether the local loop is qualified for that figure or not.

In an alternative embodiment of the present invention, the input device IN could comprise any of a variety of input devices as known to the skilled person, such as dedicated push buttons, a touch screen, etc. Similarly, the output device OUT could comprise any of a variety of output devices as known to the skilled person, such as a printer, an output file, etc.

In an alternative embodiment of the present invention, the time domain reflectometry unit TDR would monitor the line status by measuring the power spectral density of the local loop in the voice band and by determining whether it is greater or less than a pre-determined threshold. The line status would be latched in a register that is addressable by the processing unit PROC via the I/O address range. The processing unit PROC would be interrupted with a dedicated interrupt vector whenever the line status changes. The processing unit PROC could also polls cyclically the line status register. The time domain reflectometry unit TDR could also notify the line status changes to the processing unit PROC via the data communication bus COM by means of dedicated message primitives. The processing unit PROC would automatically trigger a first time domain reflectometry measurement while the line is idle (PSD<threshold) and a second time domain reflectometry measurement while the line is busy (PSD≧threshold). In so doing, the processing unit PROC would ascertain the line status during the reflectometry measurements and the whole qualification procedure would be automated.

In an alternative embodiment of the present invention, the input, output and processing means would reside on a remote host, while the time domain reflectometry unit TDR would be mounted on a card and plugged into a card slot of a telecommunication network element such as Digital Subscriber Line Access Multiplexer (DSLAM). The time domain reflectometry unit TDR would be coupled to the processing means via a data communication network such as the internet, a Local Area Network (LAN) or a Wide Area Network (WAN).

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method to qualify a local loop (LP), which connects customer premises (CP) to a central office of a telecommunication network (CO), and which comprises at least three loop terminations (TERM 1, TERM 2, TERM 3), said method comprising the steps of carrying out at a first loop termination (TERM 1) out of said at least three loop terminations a first reflectometry measurement of said local loop while a second loop termination out of said at least three loop terminations, which is wired to said customer premises, is loaded with a first impedance (ZL=Z1), thereby providing a first reflectogram, which is used for qualifying said local loop, characterized in that said method further comprises the steps of:

carrying out at said first loop termination a second reflectometry measurement of said local loop while said second loop termination is loaded with a second impedance distinct from said first impedance (ZL=Z2), thereby providing a second reflectogram, determining in the time domain a feature which distinguishes said first reflectogram from said second reflectogram, identifying from said feature said second loop termination out of said at least three loop terminations (CP=TERM 2).

2. A method according to claim 1, characterized in that the plain old telephony service is supplied over said local loop, and in that said first impedance and said second impedance are an impedance load of a communication terminal at said customer premises being on-hook and off-hook respectively, or vice-versa.

3. A method according to claim 1, characterized in that said first reflectometry measurements and said second reflectometry measurements are time domain reflectometry measurements.

4. A method according to claim 1, characterized in that said first reflectometry measurements and said second reflectometry measurements are frequency domain reflectometry measurements, and in that said method further comprises the step of converting back to the time domain said first reflectometry measurements and said second reflectometry measurements, thereby providing said first reflectogram and said second reflectogram.

5. A method according to claim 3, characterized in that said method further comprises the steps of:

delineating an incident wave and a reflected wave from said first reflectometry measurements, computing from said first reflectometry measurements a time domain reflectogram of a reference signal, thereby providing said first reflectogram, delineating an incident wave and a reflected wave from said second reflectometry measurements, computing from said second reflectometry measurements a time domain reflectogram of a reference signal, thereby providing said second reflectogram.

6. An apparatus to qualify a local loop (LP), which connects customer premises (CP) to a central office of a telecommunication network (CO), and which comprises at least three loop terminations (TERM 1, TERM 2, TERM 3), said apparatus comprising a reflectometry unit (TDR) coupled to said local loop and adapted to carry out at a first loop termination (TERM 1) out of said at least three loop terminations a first reflectometry measurement while a second loop termination out of said at least three loop terminations, which is wired to said customer premises, is loaded with a first impedance (ZL=Z1), thereby providing a first reflectogram, which is used for qualifying said local loop, characterized in that said reflectometry unit is further adapted to carry out at said first loop termination a second reflectometry measurement while said second loop termination is loaded with a second impedance distinct from said first impedance (ZL=Z2), thereby providing a second reflectogram, and in that said apparatus further comprises processing means (PROC) coupled to said reflectometry unit and adapted to determine in the time domain a feature which distinguishes said first reflectogram from said second reflectogram, and to identify from said feature said second loop termination out of said at least three loop terminations (CP=TERM 2).

7. An apparatus according to claim 6, characterized in that said reflectometry unit is a time domain reflectometry unit adapted to carry out time domain reflectometry measurements.

8. An apparatus according to claim 6, characterized in that said reflectometry unit is a frequency domain reflectometry unit adapted to carry out frequency domain reflectometry measurements, and in that said processing unit is further adapted to convert said first reflectometry measurements and said second reflectometry measurements back to the time domain, thereby providing said first reflectogram and said second reflectogram.

9. An apparatus according to claim 7, characterized in that said time domain reflectometry unit is further adapted to delineate an incident and a reflected wave from said first reflectometry measurements, in that said processing unit is further adapted to compute from said first reflectometry measurements a time domain reflectogram of a reference signal, thereby providing said first reflectogram, in that said time domain reflectometry unit is further adapted to delineate an incident and a reflected wave from said second reflectometry measurements, and in that said processing unit is further adapted to compute from said second reflectometry measurements a time domain reflectogram of a reference signal, thereby providing said second reflectogram.

10. An apparatus according to claim 6, characterized in that said processing means are remotely coupled to said reflectometry unit via a data communication network.

* * * * *